(12) United States Patent
Caviglia et al.

(10) Patent No.: US 8,203,931 B2
(45) Date of Patent: Jun. 19, 2012

(54) COMMUNICATION NETWORK PROTECTION SYSTEMS

(75) Inventors: Diego Caviglia, Savona (IT); Paolo Debenedetti, Albisola Sup (IT); Massimo Enrico, Alassio (IT); Giovanni Fiaschi, Genoa (IT); Francesco Lazzeri, Riva Trigoso (IT)

(73) Assignee: Ericsson AB, Stockholm (SE)

( * ) Notice: Subject to any disclaimer, the term of this patent is extended or adjusted under 35 U.S.C. 154(b) by 563 days.

(21) Appl. No.: 10/598,087

(22) PCT Filed: Feb. 18, 2005

(86) PCT No.: PCT/EP2005/050721
§ 371 (c)(1),
(2), (4) Date: Dec. 12, 2007

(87) PCT Pub. No.: WO2005/081435
PCT Pub. Date: Sep. 1, 2005

(65) Prior Publication Data
US 2008/0219156 A1 Sep. 11, 2008

(30) Foreign Application Priority Data
Feb. 20, 2004 (IT) ............................. MI2004A0293

(51) Int. Cl.
*G01R 31/08* (2006.01)
(52) U.S. Cl. ....................................................... 370/216
(58) Field of Classification Search .................. None
See application file for complete search history.

(56) References Cited

U.S. PATENT DOCUMENTS

| | | | |
|---|---|---|---|
| 6,181,677 B1 * | 1/2001 | Valli et al. | 370/228 |
| 6,259,837 B1 * | 7/2001 | de Boer et al. | 385/24 |
| 6,683,848 B1 * | 1/2004 | Parrish | 370/218 |
| 6,973,023 B1 * | 12/2005 | Saleh et al. | 370/217 |
| 7,287,081 B1 * | 10/2007 | Deboer et al. | 709/227 |
| 7,321,932 B1 * | 1/2008 | Monga et al. | 709/227 |
| 7,345,991 B1 * | 3/2008 | Shabtay et al. | 370/221 |
| 2002/0085571 A1 * | 7/2002 | Meandzija | 370/410 |
| 2003/0012129 A1 | 1/2003 | Lee et al. | |
| 2003/0031124 A1 | 2/2003 | Chow et al. | |
| 2003/0086368 A1 | 5/2003 | Limaye et al. | |
| 2003/0206515 A1 * | 11/2003 | Licata et al. | 370/216 |
| 2004/0213149 A1 * | 10/2004 | Mascolo | 370/229 |
| 2007/0014573 A1 * | 1/2007 | Wei et al. | 398/59 |

FOREIGN PATENT DOCUMENTS

| | | |
|---|---|---|
| EP | 0221360 | 5/1987 |
| EP | 0961518 | 12/1999 |
| WO | 03/047187 | 6/2003 |

OTHER PUBLICATIONS

CCITT, Maintenance: Telecommunications Management Network I Principles for a Telecommunications Management Network, Oct. 1992, CCITT, M.3010, http://www.itu.int/rec/dologin_pub.asp?lang=e&id=T-REC-M.3010-199210-S!!PDF-E&type=items.*

* cited by examiner

*Primary Examiner* — Kevin C Harper
(74) *Attorney, Agent, or Firm* — Coats & Bennett, P.L.L.C.

(57) ABSTRACT

A communication network protection system made up of interconnected networks, at least one of which has an automatic control plane (for example ASTN) among which are terminal interconnecting nodes. With the terminal interconnection nodes, termed primary nodes, are associated corresponding secondary terminal nodes wherein a secondary terminal node is used to realize a protection circuit in case of failure of the associated primary node.

34 Claims, 12 Drawing Sheets

Tav.IV

Tav.I

Tav.II

Tav.III

Tav.IV

Tav.V

Tav.VII

Tav.VIII

Tav.XI

COMMUNICATION NETWORK PROTECTION SYSTEMS

The present invention relates to communication network protection systems and in particular to protection systems comprising terminal points or nodes in networks having an automatic control plane or program, such as an Automatic Switched Transport Network (ASTN) type.

At the present time, implementation of ASTN networks does not call for protection of terminal points. This entails that the terminal point be a single point of failure (SPOF) for the service supported.

In particular, in known systems, a failure of an original termination point, of a destination termination point or of both, causes an out-of-commission irreparable by the protection system.

In addition, with the known systems, the interworking between different networks as concerns protection is very poor.

One general purpose of the present invention is to remedy the above-mentioned shortcomings by making available a protection system offering effective protection even for terminal and interworking points between networks.

Due to the system in accordance with the present invention certain advantages completely absent from prior art systems are obtained. Among such advantages are for example, for customer services, double access points with automatic switching and integration with the automatic-protection switching mechanism of the client service (APS), while for the supplier of services (in particular ASTN) it is possible to improve the availability of the service thanks to removal of the individual failure point, optimize use of the network thanks to sharing of the band width used for the client protection side, and provide support for dual ring interconnection protection in case of interworking with access and transport networks (for example satisfying what is defined in G. 841 and G. 842 for the APS protected networks). For example, considering the interworking between MS-SPRing/SNCP and ASTN networks, a single network element (NE="Network Element") can close the MS-SPRing protection and give the traffic to a protected network thanks to ASTN. The interworking NE network member is a single point of failure (SPOF) that can be advantageously protected by the proposed mechanism.

Another purpose of the present invention is to improve the automatic control plane to support the interworking with other transport and access networks independently of their technologies (for example SDH, SONET DWDM, ATM, IP).

In view of this purpose it was sought to provide in accordance with the present invention a communication network protection system made up of interconnected networks of which at least one comprises an automatic control plane and among which there are terminal nodes and characterized in that with the terminal nodes, termed primary terminal nodes, are associated corresponding secondary terminal nodes wherein the secondary node is used to realize a protection circuit in case of failure of the associated primary node. A network with said protection system is also claimed.

Preferably the interconnected networks are connection oriented networks. Such connection oriented networks allow sending of data in a continuous stream such as, for example synchronous digital hierarchy (SDH).

To clarify the explanation of the innovative principles of the present invention and its advantages compared with the prior art there are described below with the aid of the annexed drawings possible embodiments thereof by way of non-limiting examples applying said principles. In the drawings.

Figure 1:
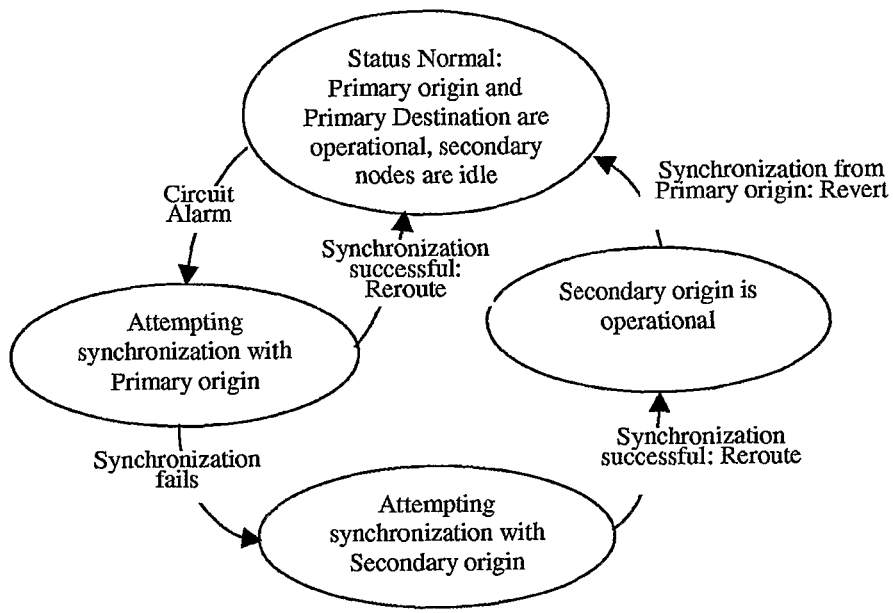
FIGS. 1 to 4 show diagrammatically status diagrams that summarize the behaviour of a primary destination node or point, a primary origin node or point, a secondary origin node or point and a secondary destination node or point respectively in accordance with the present invention.

With reference to the figures, a protection system for the terminal points is proposed in accordance with the present invention. This system will be referred herein in particular to interconnected networks at least one of which includes an automatic control program, for example ASTN based on ITU-T G. 8080 architecture.

As clarified in the examples below, the protection lies in the automatic control plane or program and can be applied to the interworking between networks with a control plane (for example ASTN) and networks protected with automatic switching or a control plane.

The system in accordance with the present invention provides protection against failures of the origin termination point, of the destination termination point or both. Also included is the ability to handle the configuration and control of the mechanism by means of a network management system. Among other things, as is readily imaginable to those skilled in the art, the network management system will be able to supply traffic and associated parameters in the M.3010 part of the network, configure the protection unit for each circuit and/or network member of the network with automatic switching, preplan restoration routing and/or support dynamic restoration routing, define and configure the protection level on the basis of SLA requirements, monitor and control switching, for example forced or manual switching, change of rules et cetera. The network management system can also support an integrated view of the network and FCAPS functions (fault, configuration, administration, performance and security) to support traditional M.3010 subnetwork management, automated switched subnetwork management, interworking links and traffic, end-to-end provisioning, fault management and correlation, automatic setting of the parameters for protection and restoration interworking (e.g. hold-off time, path-info, WTR).

The present invention is advantageously conceived as a complement of a known on-the-fly restoration scheme. To this end, it is assumed that the restoration scheme has at least the following characteristics:

A restored point-to-point circuit implementation requires information on the end nodes that declare that the circuit is restored;

If one of the end nodes fails, recovery is impossible but the other end node can detect the failure;

The end nodes have different restoration rules; one is declared controller and the other cooperator;

If the controller end node detects the circuit failure, it calculates an alternative path and signals it through the network. The previous path is also cancelled to avoid unused connections;

If the cooperator end node detects the circuit failure, it is synchronized with the controller end node to ensure that the restoration takes place. A synchronization protocol is therefore assumed to exist between the end nodes; and It is also assumed that the controller node has either sufficient updated information on the topology of the network and its status (through routing protocol) or a way to find it if the information is not reliable enough (through crankback mechanisms).

These characteristics are known and for those skilled in the art it is easy to imagine how to obtain them. They are therefore not part of the present invention but it is assumed that they are nevertheless present for the preferred embodiments of the present invention.

As mentioned above, the purpose of the present invention is to define a restoration scheme that would give protection even for the origin and destination nodes. To this end, two origin nodes and two destination nodes are defined instead of only one. During the normal life of a circuit there will therefore be a primary origin node (PON), a primary destination node (PDN), a circuit connecting the PON and the PDN, a secondary origin node (SON), and a secondary destination node (SDN).

If neither the primary origin node (PON) nor the primary destination node (PDN) fail, the assembly made up of the primary origin node (PON), the primary destination node (PDN) and the circuit between them behaves similarly to a normal on-the-fly restoration with the known mechanism. In this case, the primary origin node (PON) plays the role of the controller node and the primary destination node (PDN) plays the role of the cooperator node. Naturally, all the end nodes (primary origin, primary destination, secondary origin, secondary destination) know the identity and role of each other.

If the primary origin node (PON) fails, the circuit also fails. With a known synchronization protocol the primary destination node (PDN) attempts to communicate with the primary origin node (PON) without succeeding (because of the failure). This way, the primary destination node (PDN) detects the failure of the primary origin node (PON).

Consequently, the primary destination (PDN) attempts to synchronize with the secondary origin (SON). The secondary origin (SON), having knowledge of the circuit end nodes, attempts to route itself to the primary destination (PDN) as though it were the only origin in a normal on-the-fly restoration. Indeed, it now plays the role of the coordinator node. A restoration circuit is thus established between the secondary origin (SON) and the primary destination (PDN). FIG. 1 shows diagrammatically a status diagram summarizing the behaviour of the primary destination node.

But if the primary destination (PDN) fails, the circuit also fails so that the primary origin node (PON) can detect the failure. Before attempting routing and signalling towards the primary destination, the primary origin attempts to synchronize itself with it. This way, the primary origin detects the failure of the primary destination and consequently attempts to synchronize with the secondary destination.

Figure 2:
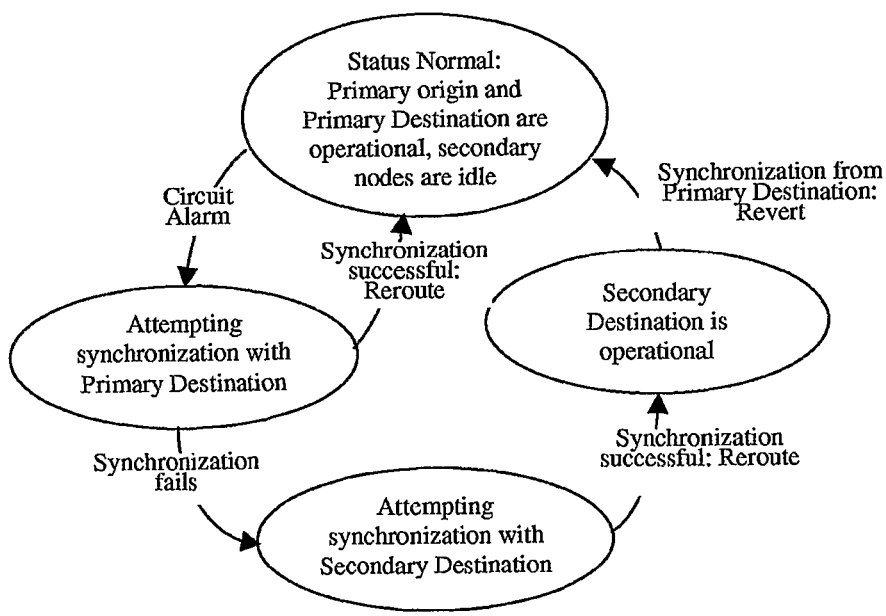

Now the primary origin node (PON) in its role of coordinator node calculates the routing to the secondary destination (SDN) and then implements it through the signalling. A restoration circuit is thus established between the primary origin and the secondary destination. FIG. 2 shows a status diagram summarizing the behaviour of the primary origin node.

Since the secondary nodes (SON and SDN) implement the same capabilities as the primary nodes (PON and PDN), a secondary origin is capable for example of restoring the circuit after a subsequent failure of a primary destination.

The above-described mechanism might not recover after simultaneous failures of destination and primary origins. By 'simultaneous failure' is meant here that the second failure occurs before the first has caused release of the restoration procedure. Indeed, in this case none of the secondary nodes could monitor the circuit while neither of the primary ones could signal the failure since both would be out of order. It will be appreciated that simultaneous failure at both origin or destination has a low occurrence probability. However, if desired, to give protection in this particularly unusual case, a 'heartbeat' type protocol can optionally be supported between primary nodes and corresponding secondary nodes as clarified below.

Figure 3:
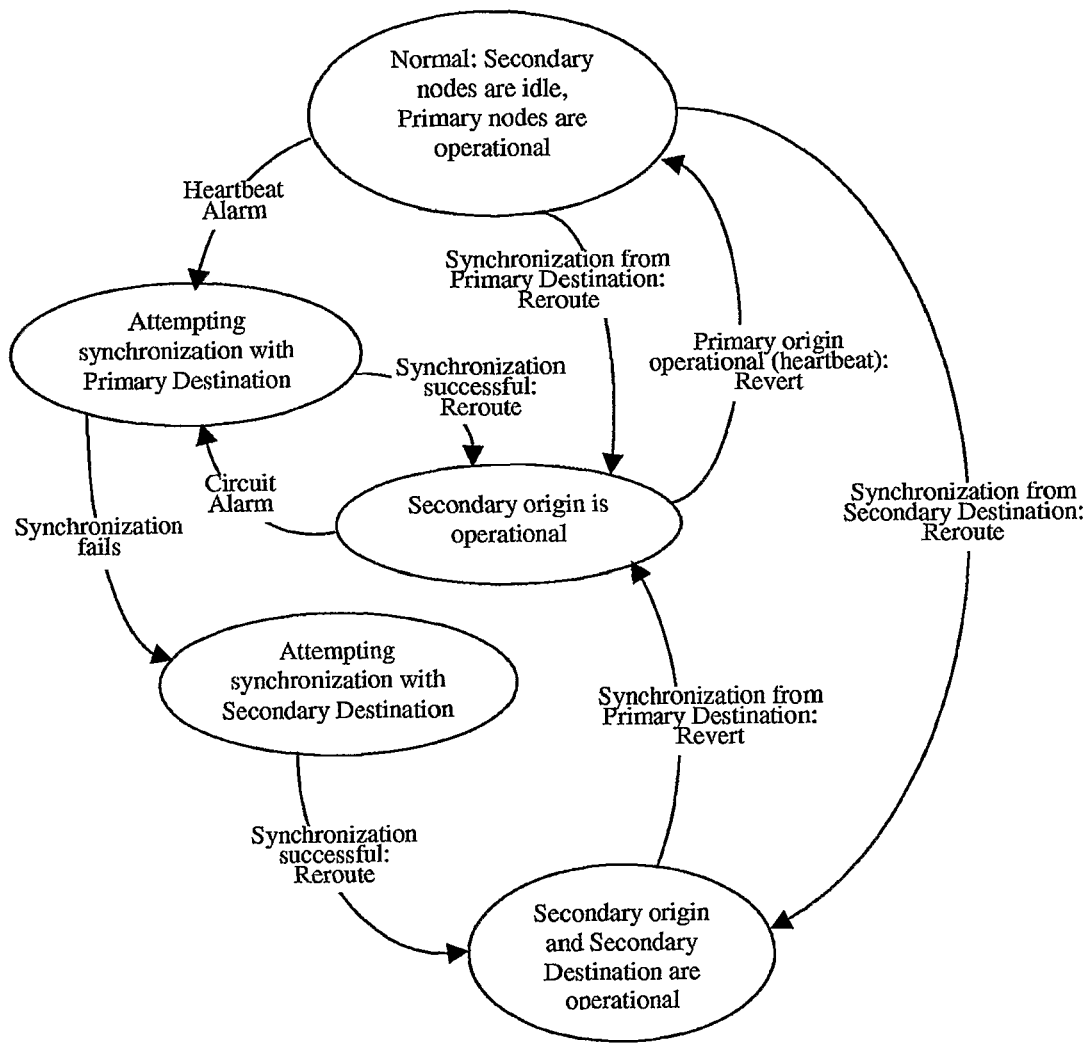
Figure 4:
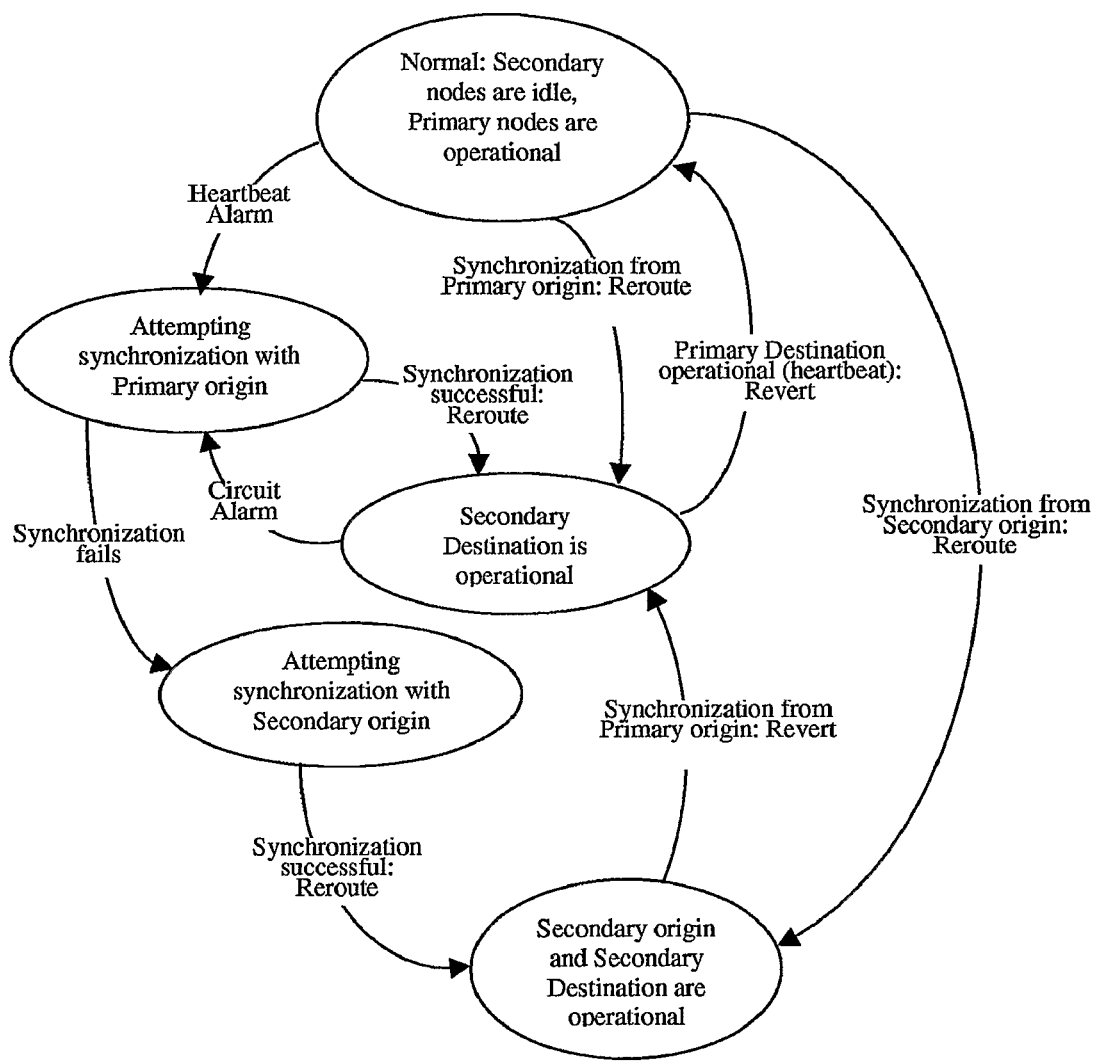

FIGS. 3 and 4 illustrate the secondary origin and secondary destination status diagrams respectively. These diagrams assume that there is use of a 'heartbeat' protocol between corresponding primary and secondary nodes and hence the mechanism shown can for example also recover a simultaneous secondary and primary failure as above-mentioned.

To further clarify the principles of the present invention some examples of resetting of circuits applying the principles of the present invention are given below.

The present invention is intended to be applied in particular to ASTN control plane based networks and includes improvements for supporting integration with conventional networks based on ITU-T M.3010 management architecture.

Application of the principles of the present invention to transport networks as described below is cited for reference in order to illustrate the benefits of the present invention for networks where protection against multiple failures and high traffic availability are essential.

Network diagrams managed in accordance with the present invention can include scenarios interworking with DWDM/SDH/SONET/ATM/IP networks assuming that the ASTN network is used as the control plane for SDH/SONET transport networks.

Figure 5:
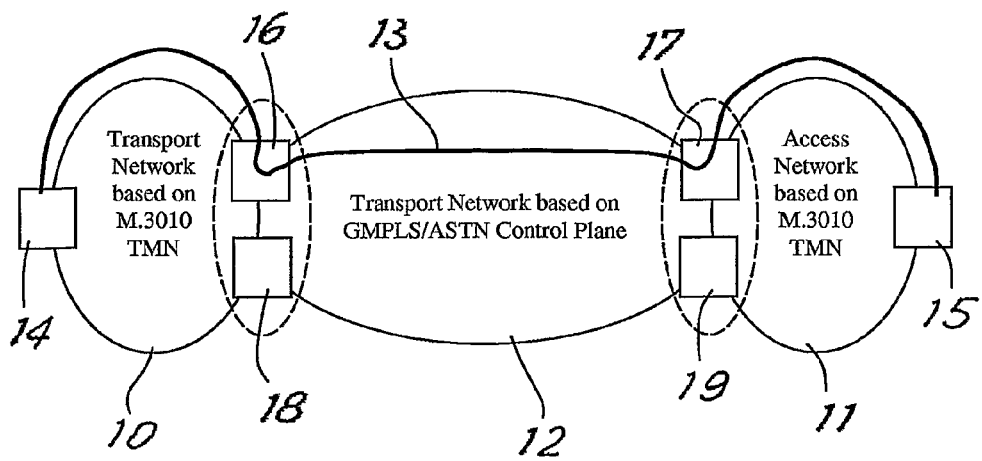
FIG. 5 shows a network scenario with subnetworks interconnected through terminal points in accordance with the present invention.

The diagram of FIG. 5 shows the interconnection of two conventional networks designated by reference numbers 10 and 11 (for example networks based on the TMN management described by ITU-T M.3010) by means of a transport network designated by reference number 12 that uses a control plane (centralized or distributed ASTN). A circuit connecting two network members 14 and 15 through two end nodes 16, 17 is designated by reference number 13. In accordance with the present invention, with the primary end nodes 16, 17 are associated two secondary end nodes 18, 19 that do not intervene in creation of the circuit until the two primary nodes are fully operational.

For the sake of description clarity, it is assumed that the node 16 is the primary source of the ASTN path and the node 17 the primary destination of the ASTN path while the nodes 18 and 19 are the secondary source and the secondary destination respectively of the ASTN path.

To go into greater detail, the behaviour of the system is described assuming that the networks 10, 11 are in particular two known MS-SPRing access networks (FIGS. 6-9) or two SNCP networks FIGS. 10-20).

In case of connection from MS-SPRing to ASTN to MS-SPRing, the improvements in the model and signalling brought by the present invention in comparison with the prior art realize protection groups supporting primary and secondary network element roles and signalling between primary and secondary to ensure that a failure of the primary gives switching of the restoration path.

Figure 6:
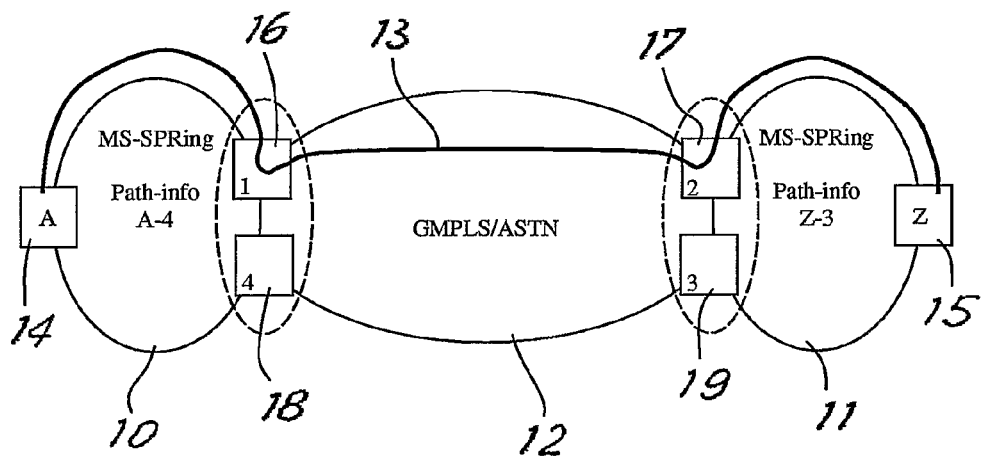
FIG. 6 shows a second network scenario with subnetworks interconnected through terminal points in accordance with the present invention.
Figure 7:
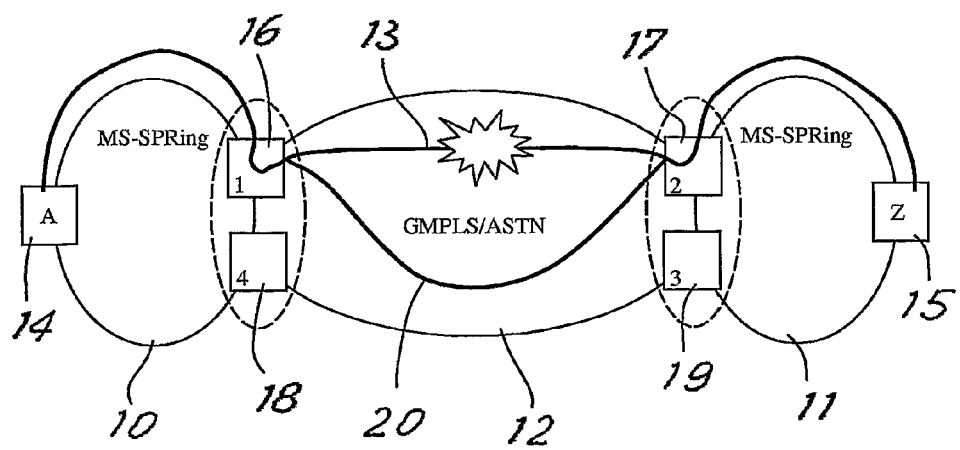
FIGS. 7 to 9 show the behaviour of the network of FIG. 6 in case of various types of failure.

FIG. 6 illustrates an ASTN backbone with two MS-SPRing networks. In FIG. 6 the node 16 is the primary source in the GMPLS/ASTN path, the node 17 is the primary destination of the GMPLS/ASTN path, the node 18 is the secondary source of the GMPLS/ASTN path and the node 19 is the secondary destination of the GMPLS/ASTN path. The path information (Path-info) of the MS-SPRing networks is set in accordance with the G-842 protection diagrams to indicate in the network 10 connection between the node 14 (A) and the node 18 (4) and, similarly, in the network 11, connection between the node 15 (Z) and the node 19 (3).

Figure 8:
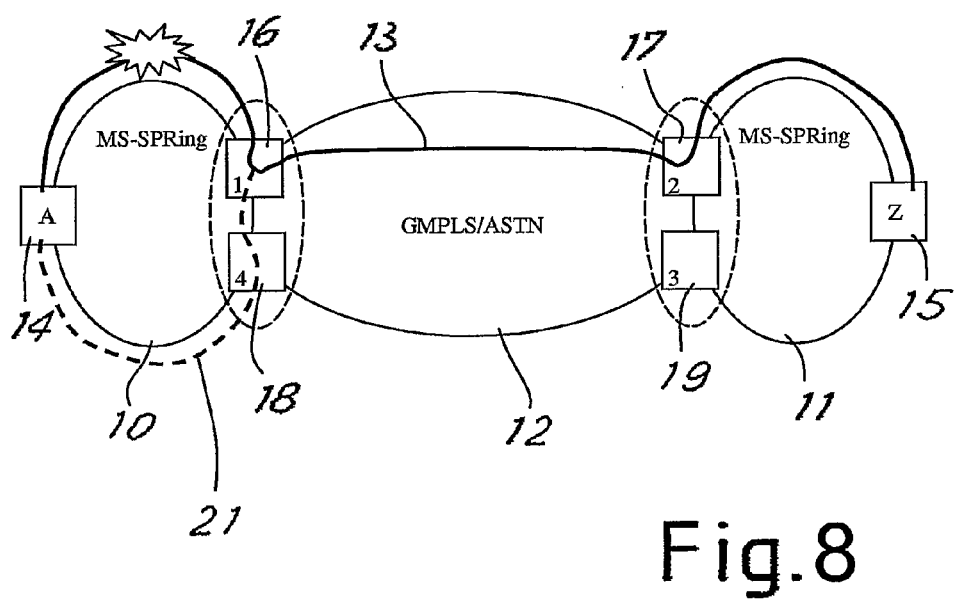

There can be three possible failures:

Failure in the ASTN domain: this failure is covered through the ASTN on-the-fly (OTF) mechanism, which is known and hence not described in detail here. In case of failure in the backbone, the ASTN restoration mechanism restores the traffic. For example, the known so-called on-the-fly mechanism where the failed circuit is cancelled after a new circuit has been created is considered ASTN restoration. By way of example, a failure of the backbone with resulting reset is shown diagrammatically in FIG. 7. As may be seen, in this case a new SNC 20 is created between the primary destination and the ASTN primary origin;

Failure in the MS-SPRing domains: these failures are covered through the MS-SPRing protection mechanism, also known and hence not described in detail. FIG. 8 shows diagrammatically on the MS-SPRing network 10 a failure protected by a standard MS-SPRing mechanism restoring a path 21; and Failure afflicting the primary origin (PON) and/or the primary destination (PDN); these types of failures could not by discovered by the known standard MS-SPRing or ASTN OTF mechanisms and need the principles of the present invention.

Figure 9:
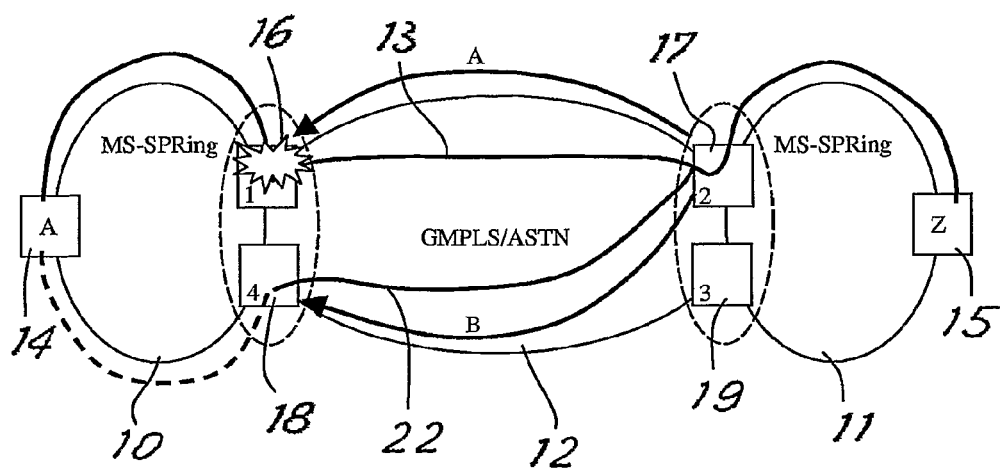

For this last type of failure, FIG. 9 shows diagrammatically the case where a failure afflicts the primary origin 16. In this case, the MS-SPRing network 10 switches the client traffic to the secondary origin (SON) 18(NE_4) using standard protection diagrams (for example G. 842). The primary destination 17 (NE_2) sends a message A to the primary origin 16 (NE_1). This message requires the primary origin 16 to start the OTF reset diagram. Because of the failure, the primary origin 16 is not able to reply to the message.

PDN 17 (NE_2) detects that PON 16 (NE_1) has failed and hence that it is not able to reset the traffic. At this point PDN 17 (NE_2) recognizes that the network member protecting PON 16 (NE1) is SON 18 (NE4) and sends a message B to SON 18 (NE_4) to start the ASTN OTF reset mechanism. As soon as SON 18 (NE_4) receives the message B it starts creation of the new SNC within the ASTN domain.

Using the heartbeat protocol between primary and secondary NE, the mechanism is able to verify when the primary is restored and supports a switch back protocol (for example of the "not revertive/revertive" type). When the primary is reset, the protection group can decide whether to cancel the restoration path (if there is no other failure) or support another OTF restoration.

A first example of interconnection of SNCP to ASTN to SNCP networks (Type 1—virtual ring protection) will now be discussed.

In accordance with the present invention, the improvements in the model and the signalling will comprise protection groups supporting primary and secondary network element roles, restoration routing not including the primary network element, signalling to include client alarms as switching criteria, signalling between primary and corresponding secondary nodes, and signalling to ensure that a failure on the SNCP protection side deactivates the restoration routing to free restoration resources.

Figure 10:
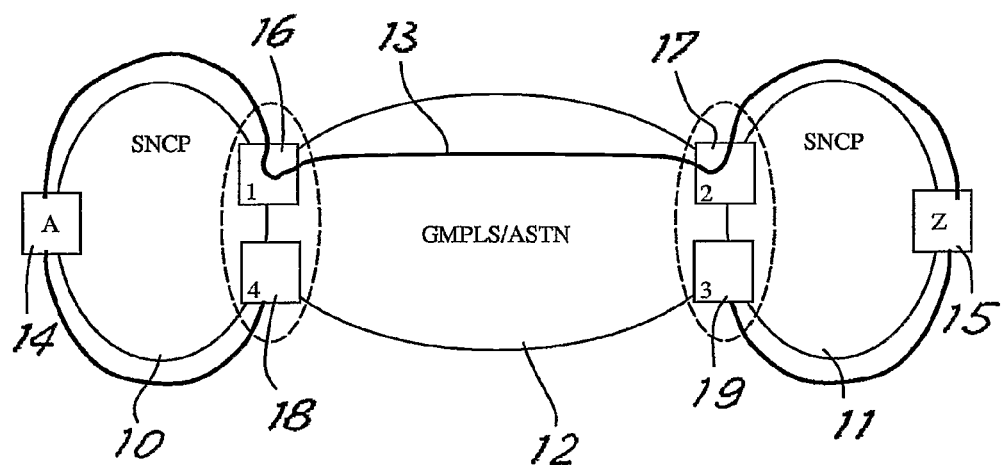
FIG. 10 shows a third network scenario with subnetworks interconnected through terminal points in accordance with the present invention.

FIG. 10 shows the situation during normal operation with the members 14 and 15 interconnected by a circuit 13, with the nodes 16 and 17 realizing the primary source and destination of the normal SNCP routing. The nodes 18 and 19 (respectively secondary source and secondary destination) are already arranged as SNCP protection routings.

The primary destination can start a restoration on the basis of the failure of the traffic on normal routing. Alternatively, the restoration can switch either on the basis of a heartbeat failure detected by the secondary origin or detection of a remote defect indication on the client side of the secondary origin.

Various failure cases can appear.

Figure 11:
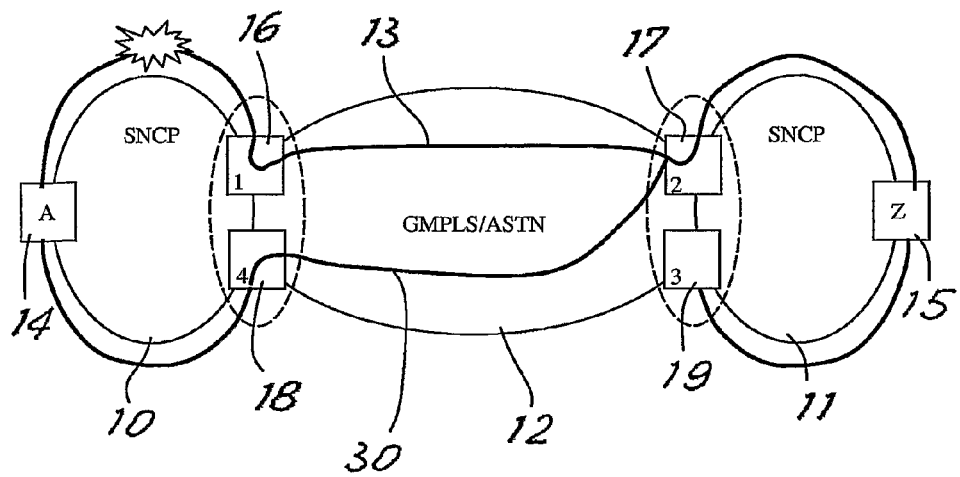
FIGS. 11 to 14 show the behaviour of the network of FIG. 10 in case of various types of failure.
Figure 12:
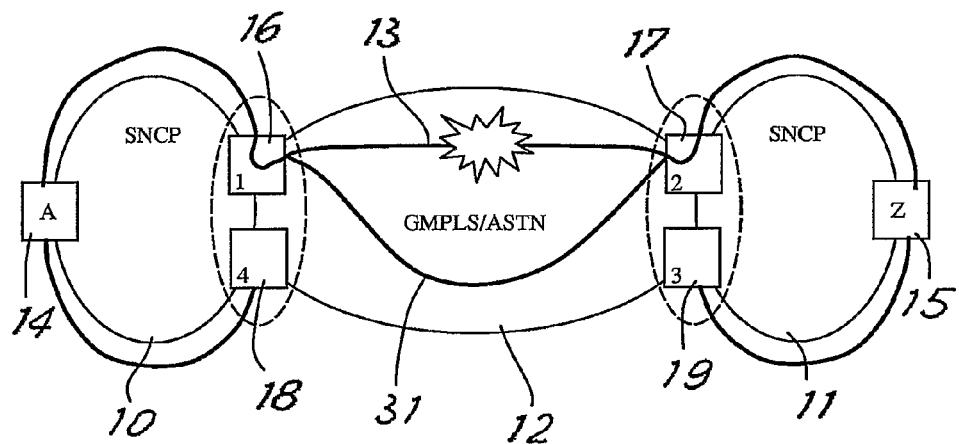

FIG. 11 shows the case of a failure at the client input to the primary origin 16. The primary origin declares unavailability to the secondary origin (switching of the protection unit). The primary destination 17 detects the failure and starts the traffic restoration. The traffic is restored by the secondary origin 18 and the primary destination 17 which connect through the circuit 30 in the ASTN network FIG. 12 shows the case of a failure in the ASTN backbone network. The on-the-fly (OTF) restoration restores the traffic between the destination and the primary origin in the conventional manner by means of a circuit 31.

Figure 13:
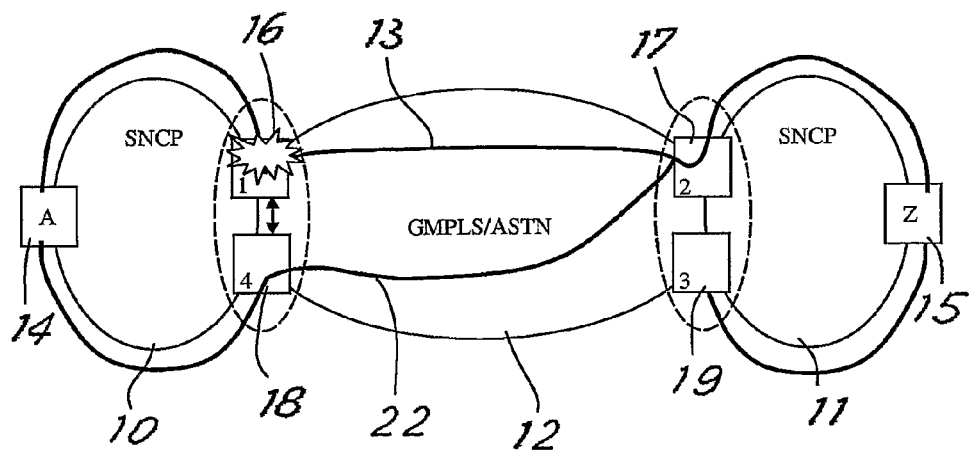

FIG. 13 shows the case of a failure of the network member of primary origin 16. Since the heartbeat is lacking because of the failure, the secondary origin 18 switches to the protection unit coordinator and ensures the OTF restoration. Similar behaviour would occur in case of failure of the primary destination.

Figure 14:
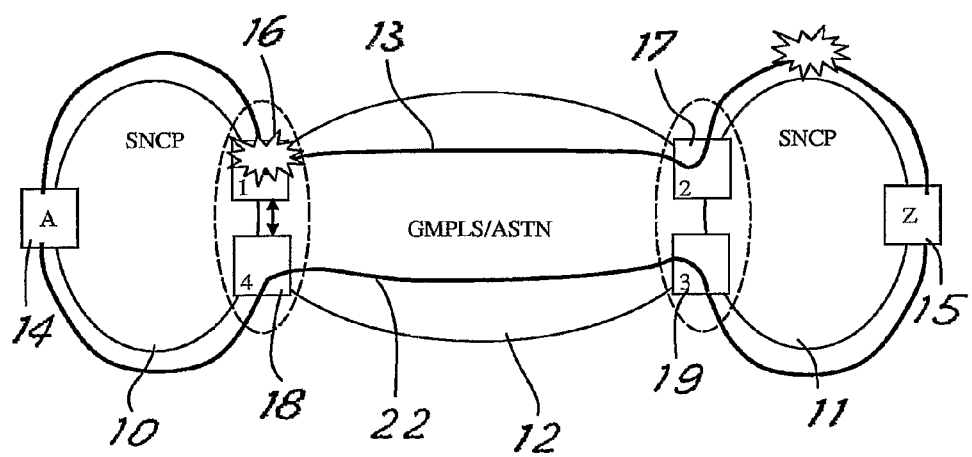

FIG. 14 shows the case of a failure on the client side of the primary destination 17 (the primary declares unavailability and switches the protection group) and of the primary origin 16 (the protection group switches to the secondary origin 18). The restoration is coordinated through the secondary destination 19 and the secondary origin 18.

Figure 15:
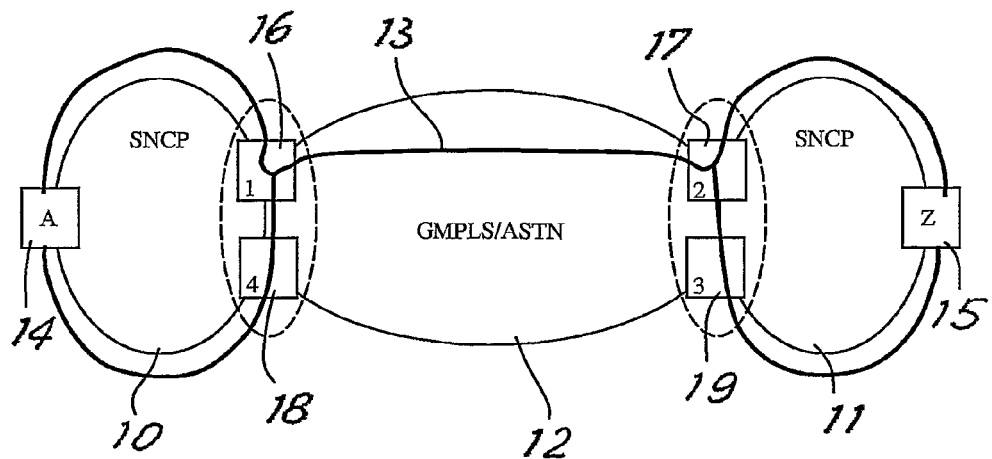
FIG. 15 shows another possible network scenario with subnetworks interconnected through terminal points in accordance with the present invention.

With reference to FIG. 15, a second example of interconnection of SNCP to ASTN to SNCP networks (Type 2—dual ring protection) is discussed. The purpose is to give an availability level equivalent to that of the ITU-T G.842 scenarios with protection from SNCP to SNCP. A 1:N protection in the ASTN subnetwork is discussed.

The improvements in the model and signalling mechanism used will comprise a protection group supporting primary and secondary network members, network elements supporting four-point SNCP, a restoration routing engine capable of supporting multiple SNCP points, signalling for including client alarms as switching criteria, and signalling between primary and corresponding secondary nodes.

The situation during normal operation is shown diagrammatically in FIG. 15. The primary source 16 and the primary destination 17 are included in the SNCP worker side of the traffic in each ring. The secondary source and destination 18, 19 are included in the SNCP protection side of the traffic in each ring.

Figure 16:
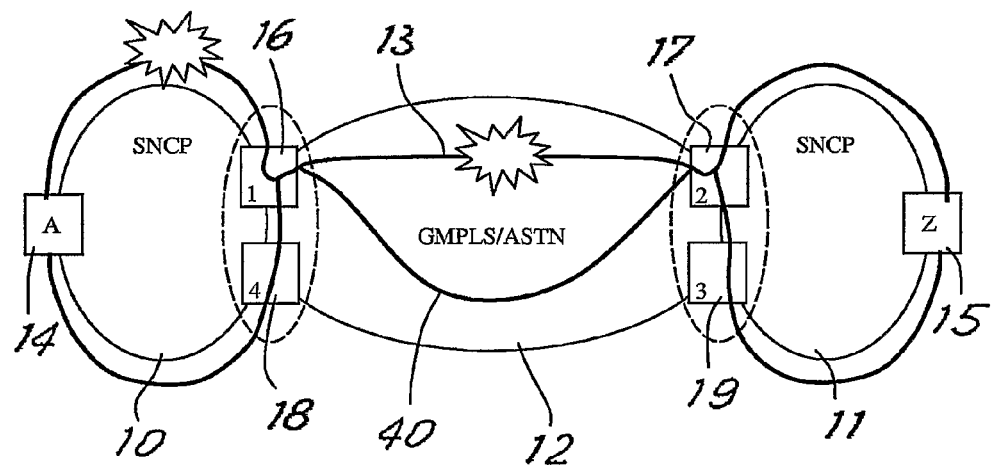
FIGS. 16 to 19 show the behaviour of the network of FIG. 15 in case of various types of failure.

FIG. 16 shows the situation following failure on the ASTN primary routing and connection failure to the client side of the primary origin 16. With the conventional mechanism the restoration is carried out by the primary destination and origin, which establish a replacement circuit 40 in the ASTN network.

Figure 17:
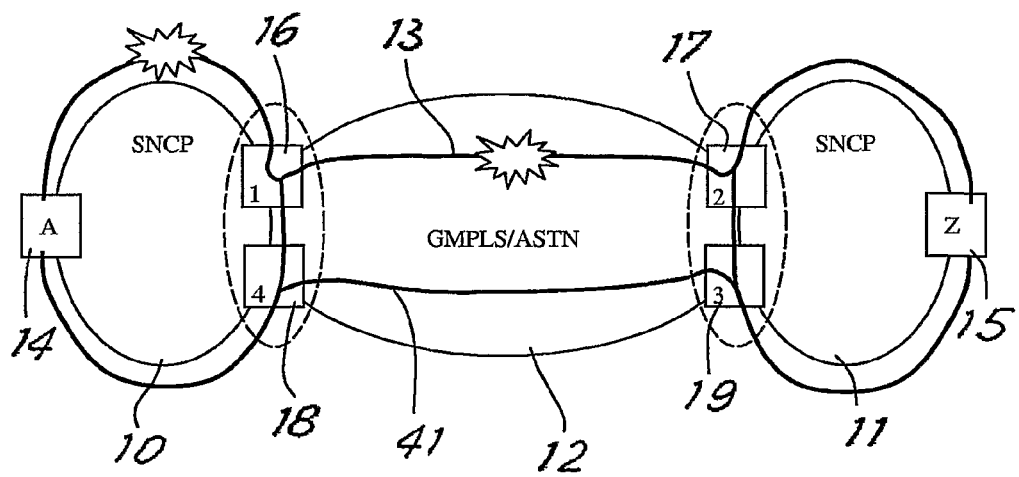

FIG. 17 shows an alternative solution in which, after failure of the ASTN backbone and the client side connection to the primary origin 16, the ASTN protection group switches to the secondary origin and the restoration is completed by the secondary destination and origin through the circuit 41. This solution can be applied for example in the case of network elements (NE) that do not support four-point SNCP.

Figure 18:
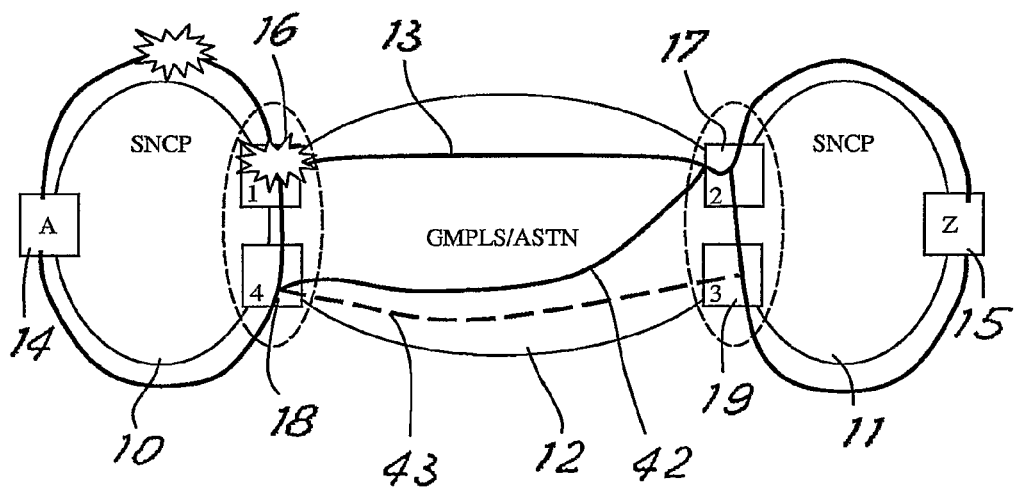

FIG. 18 shows the situation after failure of the primary origin 16. The secondary origin 18 detects the failure of the primary origin and takes control of the ASTN protection group to restore the connection with the primary destination (as indicated by 42) or alternatively the secondary destination (as indicated by 43).

Figure 19:
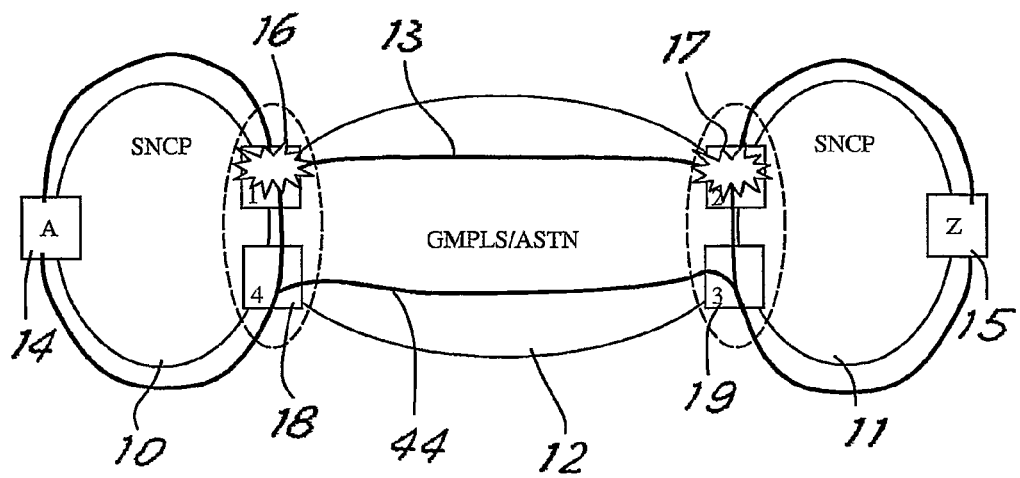

FIG. 19 shows the case of a failure in the primary destination and a failure in the primary origin. The secondary origin and the secondary destination detect the failures of the primary origin and destination and take control of the ASTN protection unit so as to provide the mechanisms for restoring the traffic between the primary destination and origin (through 44).

Figure 20:
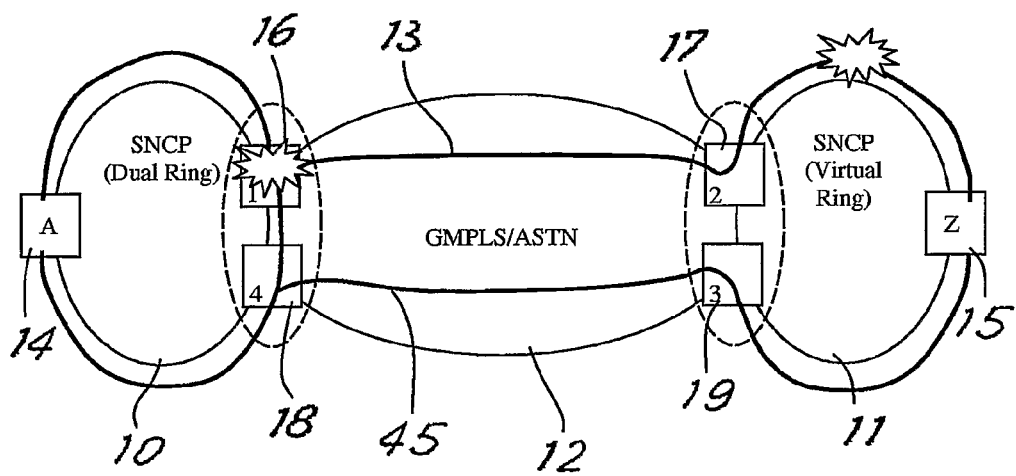
FIGS. 20 to 22 show various other examples of scenarios of networks applying the principles of the present invention.

FIG. 20 shows the case in which only the primary origin 16 receives the SNCP protected traffic while the primary destination is in accordance with a SNCP type 1 scenario (virtual ring only) already discussed above. In case of failures both on the client side of the primary destination 17 and the primary origin 16, the primary destination 17 declares unavailability and switches the protection group to the secondary destination 19. The secondary origin 18 coordinates the restoration because of unavailability of the primary origin 16 and the circuit is restored through 45.

The predetermined purposes of the invention have been achieved by defining interworking protection schemes (for survival from failures of the origin end points, destination end points and origin and destination points) including in the ASTN control plane the concepts and implementation of:
1. Protection group supporting primary and secondary end points;
2. Signalling and automatic polling mechanisms (for example with heartbeat protocols) to ensure that the secondary stands in for the primary in case the communication and/or traffic towards the primary is lost;
3. Supporting switching criteria based on alarm monitoring on the client side of the ASTN network. For interworking with networks protected by automatic protection switching diagrams (for example based on SDH MS-SPRing/SNCP rings for transport or access networks), the traffic is provisioned between primary nodes while protection can be calculated on-the-fly (OTF) (optional) or pre-provisioned (optional).

Naturally the above description of an embodiment applying the innovative principles of the present invention is given by way of non-limiting example of said principles within the scope of the exclusive right claimed here. For example, in case of multiple failures, coordination of the protection mechanisms depends on correct settings of the protection and hold-off/wait-to-restore parameters. On the basis of the required behaviour, these settings can be configured on each individual network element or circuit or automatically calculated and configured by the network management system.

Figure 21:
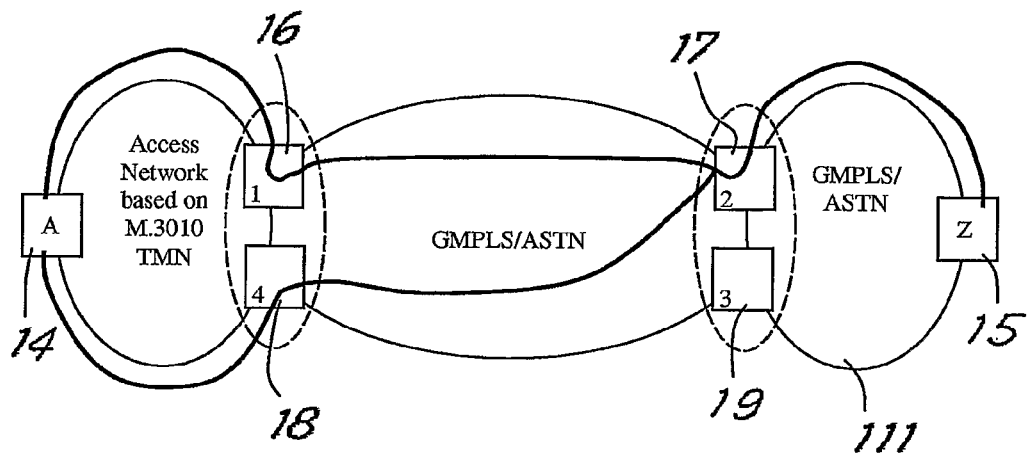
Figure 22:
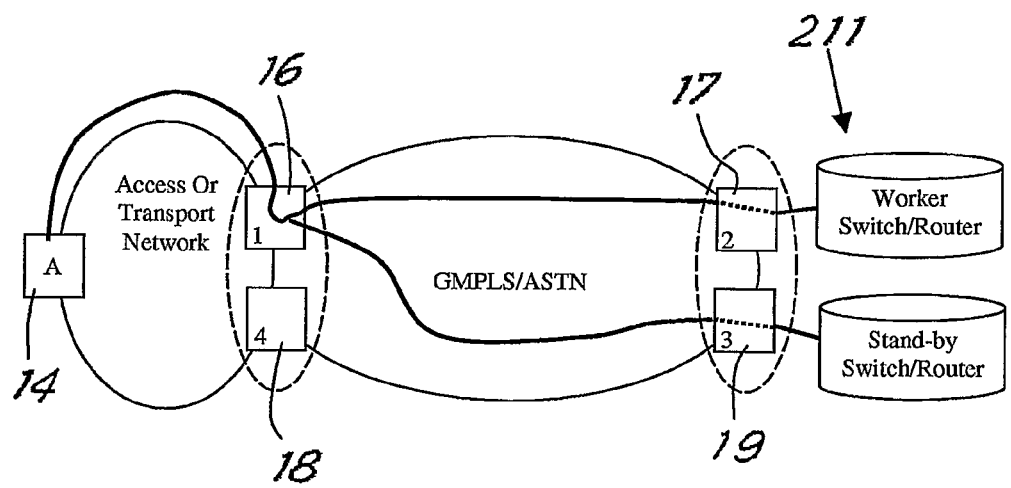

It is also clear how in accordance with the present invention it can be used in scenarios different from those given as examples above and shown since the present invention applies to protection of networks in which there is interworking between networks with control plane and networks protected by automatic switching or a control plane. For example, interworking can take place with other types of networks with proprietary control planes or of other suppliers, with support for 'Client dual-homing' protection (for example by ATM/IP applications) and with rerouting of the traffic in case of client-side failure. For example, the diagram of FIG. 21 shows interworking with another ASTN control plane (indicated as a whole by reference number 111) while the diagram of FIG. 22 shows the possibility of interworking with client services with dual-homing clients and/or reserve systems (indicated as a whole by reference number 211).

Lastly, the application scenarios of the present invention can also be made up of a combination (for example by SNCP to MS-SPRing, by SNCP Type 1 to SNCP Type 2 et cetera) of the above-described scenarios.

The invention claimed is:

1. A protection system for first and second communication networks interconnected by an Automatic Switched Transport Network (ASTN) having an ASTN control plane, the first network including a first primary terminal node configured to interconnect to a second primary terminal node of the second network over a primary communication circuit, the system comprising:
a first secondary terminal node associated with the first primary terminal node in the first network;
a second secondary terminal node associated with the second primary terminal node in the second network;
the first and second secondary terminal nodes configured to establish a secondary communication circuit to interconnect the first and second secondary terminal nodes responsive to a failed interconnection between the first and second primary terminal nodes;
the ASTN control plane configured to implement signaling and automatic polling mechanisms to switch traffic from the first and second primary terminal nodes to the first and second secondary terminal nodes responsive to the failed interconnection between the first and second primary terminal nodes; and
wherein the criteria for switching the traffic to the secondary communication circuit are based on alarm monitoring on a client side of the ASTN network.

2. The system of claim 1 wherein at least one of the first and second networks comprises an automatic control plane (ACP), and wherein the other of the first and second networks is protected by one of an automatic switching mechanism and a control plane mechanism.

3. The system of claim 1 wherein the first primary terminal node and the first secondary terminal node in the first network comprise source nodes, and wherein the second primary terminal node and the second secondary terminal node in the second network comprise destination nodes.

4. The system of claim 1 wherein the first primary terminal node and the first secondary terminal node in the first network comprise destination nodes, and wherein the second primary terminal node and the second secondary terminal node in the second network comprise source nodes.

5. The system of claim 1 wherein, during normal operation, the first and second primary terminal nodes in the first and second networks, respectively, communicate over the primary communication circuit and use an on-the-fly circuit restoration mechanism.

6. The system of claim 5 wherein the first primary terminal node in the first network comprises a primary origin node, and wherein the second primary terminal node in the second network comprises a primary destination node.

7. The system of claim 6 wherein the primary origin node comprises a controller node, and wherein the primary destination node comprises a cooperator node.

8. The system of claim 7 wherein the primary destination node is configured to detect a failure of the primary origin node responsive to detecting a failed synchronization attempt with the primary origin node.

9. The system of claim 8 wherein the primary destination node is further configured to establish the secondary communication circuit with the first secondary terminal node in the first network responsive to detecting the failed synchronization attempt with the primary origin node.

10. The system of claim 7 wherein the primary origin node is configured to detect a failure of the of the primary destination node responsive to detecting a failed synchronization attempt with the primary destination node.

11. The system of claim 10 wherein the primary origin node is further configured to establish the secondary communication circuit with the second secondary terminal node in the second network responsive to detecting the failed synchronization attempt with the primary destination node.

12. The system of claim 4 wherein the primary origin node comprises a controller node configured to calculate a circuit routing to the second secondary terminal node, and signal the second secondary terminal node to establish the secondary communication circuit.

13. The system of claim 1 wherein each of the first and second secondary terminal nodes is configured to detect a failure of its respective associated primary terminal node using a heartbeat protocol communicated with its respective associated primary terminal node.

14. The system of claim 13 wherein at least one of the first and second secondary terminal nodes is configured to establish a reset circuit with the other of the first and second secondary terminal nodes responsive to a failure of both the first and second primary terminal nodes.

15. The system of claim 1 wherein at least one of the first and second networks comprises a network based on a TMN ITU-T M. 3010 management architecture.

16. The system of claim 1 wherein at least one of the first and second networks comprises a MS-SPRing network.

17. The system of claim 16 wherein the first network comprises the MS-SPRing network, and wherein path information for the MS-SPRing network is configured according to one or more protection diagrams that indicate a communication path between the first primary terminal node in the MS-SPRing network and the first secondary terminal node.

18. The system of claim 17 wherein the MS-SPRing network is configured to switch client traffic to the first secondary terminal node responsive to a failure of the first primary terminal node in the MS-SPRing network.

19. The system of claim 18 wherein the second primary terminal node in the second network is configured to send a first restoration message to the first primary terminal node in the MS-SPRing network to the start an on-the-fly ASTN restoration scheme.

20. The system of claim 19 wherein, if the first primary terminal node in the MS-SPRing network fails to answer the first restoration message, the second primary terminal node in the second network is configured to send a second restoration message to the first secondary terminal node to the start the on-the-fly ASTN restoration scheme.

21. The system of claim 1 wherein at least one of the first and second networks comprises a SNCP network.

22. The system of claim 21 wherein the first network comprises a virtual ring SNCP network.

23. The system of claim 22 wherein if the first primary terminal node in the virtual ring SNCP network detects a failure at a client input, the first primary terminal node in the virtual ring SNCP network is configured to indicate the failure to the first secondary terminal node.

24. The system of claim 23 wherein the second primary terminal node in the second network begins an ASTN traffic restoration procedure to the second secondary terminal node responsive to detecting the failure of the first primary terminal node in the virtual ring SNCP network.

25. The system of claim 23 wherein the first primary terminal node in the virtual ring SNCP network is configured to begin an on-the-fly restoration procedure responsive to a failure at the second primary terminal node in the second network.

26. The system of claim 23 wherein the second primary terminal node in the second network is configured to begin an on-the-fly restoration procedure responsive to a failure at the first primary terminal node in the virtual ring SNCP network.

27. The system of claim 1 wherein the first network comprises an SNCP network having a dual ring interconnection protection scheme.

28. The system of claim 27 wherein if both of the first and second primary terminal nodes detect a failure, the first primary terminal node in the SNCP network indicates the failure to the first secondary terminal node, and switches an ASTN protection group to the first secondary terminal node to establish the second communication circuit.

29. The system of claim 27 wherein if both of the first and second primary terminal nodes detect a failure, the second primary terminal node in the second network indicates the failure to the second secondary terminal node, and switches an ASTN protection group to the first secondary terminal node to establish the second communication circuit.

30. The system of claim 27 wherein the first secondary terminal node is configured to detect a failure of the first primary terminal node in the in the SNCP network, and control an ASTN protection group to restore a connection with the second primary terminal node in the second network.

31. The system of claim 27 wherein the first secondary terminal node is configured to detect a failure of the first primary terminal node in the in the SNCP network, and control an ASTN protection group to restore a connection with the second secondary terminal node.

32. The system of claim 27 wherein an ASTN protection group switches to the first secondary terminal node in the SNCP network to establish a communication circuit between the first and second secondary terminal nodes.

33. The system of claim 27 wherein an ASTN protection group switches to the second secondary terminal node in the second network to establish a communication circuit between the first and second secondary terminal nodes.

34. A method for protecting communications between first and second communication networks interconnected by an Automatic Switched Transport Network (ASTN) having an ASTN control plane, the first network including a first primary terminal node configured to interconnect to a second primary terminal node of the second network over a primary communication circuit, and a first secondary terminal node associated with the first primary terminal node configured to communicatively interconnect to a second secondary terminal node associated with the second primary terminal node in the second network, the method comprising:
    detecting a failure of the interconnection between the first and second primary terminal nodes;
    establishing a secondary communication circuit to interconnect the first and second secondary terminal nodes;

the ASTN control plane configured to implement signaling and automatic polling mechanisms to switch communications from the first and second primary terminal nodes to the first and second secondary terminal nodes responsive to detecting the failed interconnection between the first and second primary terminal nodes; and wherein the criteria for switching the traffic to the secondary communication circuit are based on alarm monitoring on the client side of the ASTN network.

* * * * *

UNITED STATES PATENT AND TRADEMARK OFFICE
CERTIFICATE OF CORRECTION

PATENT NO. : 8,203,931 B2  
APPLICATION NO. : 10/598087  
DATED : June 19, 2012  
INVENTOR(S) : Caviglia et al.

Page 1 of 1

It is certified that error appears in the above-identified patent and that said Letters Patent is hereby corrected as shown below:

On the Title Page, in Field (75), under "Inventors", in Column 1, Line 2, delete "Sup" and insert -- Sup (SV) --, therefor.

On the Title Page, in Field (75), under "Inventors", in Column 1, Line 3, delete "Alassio" and insert -- Alassio (SV) --, therefor.

On the Title Page, in Field (75), under "Inventors", in Column 1, Line 5, delete "Trigoso" and insert -- Trigoso (GE) --, therefor.

In Column 9, Line 14, in Claim 10, delete "failure of the of the" and insert -- failure of the --, therefor.

In Column 10, Line 37, in Claim 30, delete "node in the in the" and insert -- node in the --, therefor.

In Column 10, Line 42, in Claim 31, delete "node in the in the" and insert -- node in the --, therefor.

Signed and Sealed this  
Ninth Day of April, 2013

Teresa Stanek Rea  
*Acting Director of the United States Patent and Trademark Office*